C. L. SCHMIDT.
SAFETY ATTACHMENT FOR HAT PINS.
APPLICATION FILED MAR. 19, 1910.

986,225.

Patented Mar. 7, 1911.

Witnesses:
Cecil Long
O. O. Martin

Inventor:
Carl L. Schmidt
by T. J. Geisler
Atty.

THE NORRIS PETERS CO., WASHINGTON, D. C.

UNITED STATES PATENT OFFICE.

CARL L. SCHMIDT, OF PORTLAND, OREGON.

SAFETY ATTACHMENT FOR HAT-PINS.

986,225.  Specification of Letters Patent.  Patented Mar. 7, 1911.

Application filed March 19, 1910. Serial No. 550,543.

*To all whom it may concern:*

Be it known that I, CARL L. SCHMIDT, a citizen of the United States, residing at Portland, in the county of Multnomah and State of Oregon, have invented a new and useful Improvement in Safety Attachments for Hat-Pins, of which the following is a specification.

This invention has for its purpose to provide a hook-like attachment for hat-pins by which to secure the hat-pin in place against longitudinal dislodgment. The hook-like fastening means may also be permanently attached to the hat-pin if desired, in which case, however, it would have to be adjustable on the shank of the hat-pin, so as to be able to arrange the safety device as convenient. But I prefer my invention arranged as an attachment to a hat pin, because it is simpler and cheaper to make, and one attachment would answer for all the different varieties of hat pins. I obtain my object by the means illustrated in the accompanying drawings, said means embodying the particular features hereinafter fully described and claimed.

Figure 2:
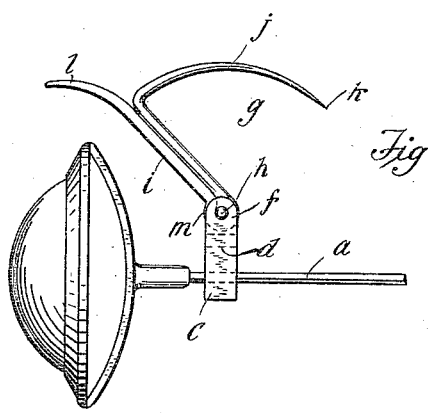
Figure 3:
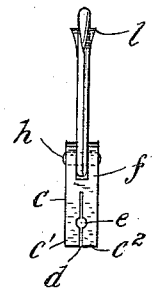
Figure 1:
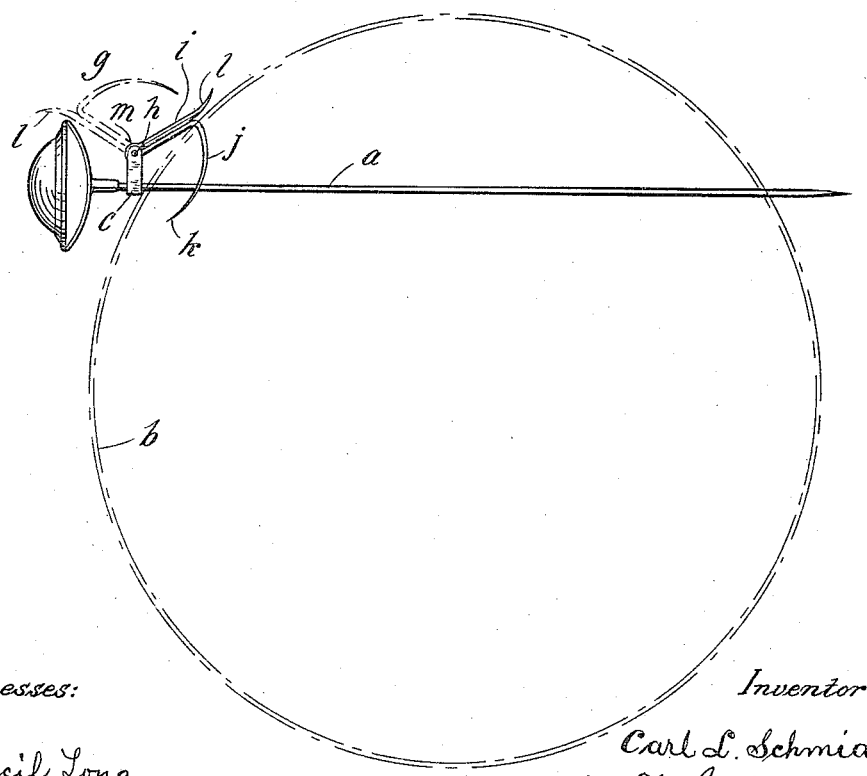

In the drawings: Figure 1 shows a broken line circle which represents the perpendicular wall of the crown of a hat, in which an ordinary hat-pin has been inserted, said hat-pin being provided with my safety attachment; Fig. 2 is an enlarged view of the head-end of the hat-pin on which my device is secured; and Fig. 3 is an end elevation of my attachment.

The hat-pin, $a$, may be of any well known construction. On the shank thereof is secured my attachment by means rendering my attachment longitudinally adjustable, so that it may be properly positioned on the shank of the pin, in order to be operated as illustrated in Fig. 1, in which, as mentioned, the broken circular outline $b$ represents the perpendicular wall portion of the crown of a hat.

My attachment comprises a clamp bar $c$ made with a longitudinal slit $d$ and provided with an annular aperture or eye $e$, in which to receive the shank of the hat-pin. When so affixed on the hat-pin the divided members $c'$, $c^2$ will compress upon the shank of the pin, and thus securely hold the clamp $c$ in place; the eye $e$ being made slightly smaller in diameter than the diameter of the shank of the hat-pin. The upper portion, $f$, of the clamp is bifurcated so as to have here inserted the hook $g$, which is secured in place by a rivet-pin $h$. The hook comprises a shank $i$, a pin-like bill $j$, formed with a point $k$, said bill curved on an arc of which the hinge axis of said hook is the center, and a shank of said hook provided with a handle-piece $l$, so arranged as to render the manipulation of the hook $g$ convenient. The hook $g$ may be made of a single piece of wire formed as shown, so as to provide an eye $m$, for the rivet-pin $h$, and the other portions of the hook being also formed in the piece of wire, as shown and described.

The mode of affixing my attachment to the hat-pin, and the manner in which my device is operated is clearly shown in Fig. 1.

By the described construction of my attachment I also obtain this advantage, that when the bill of the hook has been driven into the hat the clamp bar $c$ will be drawn over sufficiently to cause the pin to bind with the eye $e$ of the slit $d$ of said clamp bar and thus lock the pin in place. Furthermore, by reason of the described construction of the bill of the hook of my attachment, the same will enter, and is withdrawn from, the hat without making a large hole or tearing the same.

I claim:

A safety attachment for hat-pins comprising a sliding clamping bar provided at one end with a longitudinal slit having an eye formed in its opposed faces, and a hook hinged at the opposite end of said clamp bar, said hook made with a tapered bill curved on an arc of which the hinge axis of the hook is the center.

CARL L. SCHMIDT.

Witnesses:
 CECIL LONG,
 O. O. MARTIN.

---

Copies of this patent may be obtained for five cents each, by addressing the "Commissioner of Patents, Washington, D. C."